(12) United States Patent
Bae

(10) Patent No.: US 9,145,172 B2
(45) Date of Patent: Sep. 29, 2015

(54) VEHICLE BODY REINFORCING STRUCTURE

(71) Applicant: Hyundai Motor Company, Seoul (KR)

(72) Inventor: Ki Soon Bae, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/330,869

(22) Filed: Jul. 14, 2014

(65) Prior Publication Data
US 2015/0166114 A1 Jun. 18, 2015

(30) Foreign Application Priority Data
Dec. 12, 2013 (KR) .................. 10-2013-0154960

(51) Int. Cl.
*B62D 25/08* (2006.01)

(52) U.S. Cl.
CPC ...................... *B62D 25/08* (2013.01)

(58) Field of Classification Search
CPC ....................................................... B62D 25/08
USPC ................... 296/198, 187.03, 187.12
IPC ........................................................ B62D 25/08
See application file for complete search history.

(56) References Cited

U.S. PATENT DOCUMENTS 8,453,786 B2 * 6/2013 Hock et al. ................. 180/311
2012/0013149 A1 * 1/2012 Canot et al. ............ 296/187.03

FOREIGN PATENT DOCUMENTS

| JP | 06-001263 A | 1/1994 |
| JP | 2001-278116 A | 10/2001 |
| JP | 2001-354159 A | 12/2001 |
| JP | 2007-230489 A | 9/2007 |
| KR | 1020100058165 A | 6/2010 |
| KR | 10-1339278 B1 | 12/2013 |

* cited by examiner

*Primary Examiner* — Pinel Romain
(74) *Attorney, Agent, or Firm* — Morgan, Lewis & Bockius LLP

(57) ABSTRACT

A vehicle body reinforcing structure which increases rigidity of a front side member, a shock absorber housing, and a fender apron of a vehicle body may include the fender apron that connects the front side member and the shock absorber housing, and the fender apron that is formed in a pipe shape so that work hardening occurs in a process of manufacturing the pipe-shaped fender apron.

6 Claims, 3 Drawing Sheets

VEHICLE BODY REINFORCING STRUCTURE

CROSS-REFERENCE TO RELATED APPLICATION

The present application claims priority to and the benefit of Korean Patent Application No. 10-2013-0154960 filed on Dec. 12, 2013, the entire contents of which is incorporated herein for all purposes by this reference.

BACKGROUND OF THE INVENTION

1. Field of the Invention

The present invention relates to a vehicle body reinforcing structure, and more particularly, to a vehicle body reinforcing structure for increasing rigidity of a vehicle body.

2. Description of Related Art

In general, shock-absorbing performance refers to performance that mitigates impact force that occurs when two objects collide.

Recently, stability performance has attracted attention, among items of performance of a vehicle. The stability performance includes shock-absorbing performance at the time of a vehicle collision. In addition, the shock-absorbing performance is a major part of determining marketability of the vehicle. Of course, devices such as airbags and seat belts are used to mitigate impact transmitted to occupants at the time of a vehicle collision. However, the shock-absorbing performance of a vehicle body needs to be improved prior to improving performance of safety devices.

Particularly, a front body of the vehicle is a place where an engine, a front wheel suspension system, a radiator, a steering gear box and the like are mounted, and rigidity of the front body is required. Further, in the case of a front-wheel (FF) drive vehicle, since an engine room is positioned in the front body, rigidity of the front body is more important. Therefore, the front body needs to be designed to mitigate impact force and protect occupants in the interior of the vehicle at the time of a vehicle collision.

The front body includes a shock absorber housing, a front side member, a fender apron, and the like.

The shock absorber housing is a housing in which a shock absorber is mounted. The shock absorber is a constituent element of a suspension system which stabilizes the vehicle body against external impact. Further, the shock absorber allows a spring, which receives and cancels impact, to be smoothly operated, and attenuates vibration of the spring.

The front side members are members that form a frame of the front body, and mounted at both sides of a front portion below a dashboard that partitions the front body and the interior room of the vehicle. That is, the front side members are mounted at both sides of a front floor that constitutes a front bottom of the interior room of the vehicle. Further, the front side member mainly has a structure which blocks impact that is applied to the suspension system. In addition, the front side member serves to support a front bumper.

The shock absorber housing is installed on the front side member. Further, the shock absorber housing is coupled to the front side member and the fender apron by spot welding.

The fender apron refers to a portion that is positioned inside a fender, and partitions a wheel and the engine room. Further, the fender apron is coupled to the shock absorber housing and the front side member. In addition, the fender apron supports force transmitted from the suspension system, and protects numerous components.

Recently, a size of a head lamp has increased. Therefore, there is a need to adjust for a shape of the fender apron which prevents interference between the fender apron and the head lamp.

However, in a case in which a part of the fender apron has a curved shape or a tapered shape in order to prevent interference with the head lamp, rigidity of the fender apron may deteriorate, and shock-absorbing performance of the front body may be adversely affected.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle body reinforcing structure which adopts a fender apron that reduces a space occupied by the fender apron, and ensures rigidity.

Further, various aspects of the present invention are directed to providing a vehicle body reinforcing structure which improves connectivity between constituent elements of a front body, and improves shock-absorbing performance of the front body.

In an aspect of the present invention, a vehicle body reinforcing structure which increases rigidity of a front side member, a shock absorber housing, and a fender apron of a vehicle body, may include the fender apron that connects the front side member and the shock absorber housing, and the fender apron that is formed in a pipe shape so that work hardening occurs in a process of manufacturing the pipe-shaped fender apron.

The fender apron is formed by hydroforming so that the fender apron is bent to have a slowly curved surface.

The front side member may include a front side lower member connected with a lower end of the shock absorber housing, and a front side upper member connected with an upper end of the shock absorber housing, and wherein a first end of the fender apron is inserted into the front side lower member, and a second end of the fender apron is inserted into the front side upper member to be connected with the shock absorber housing by the front side upper member, wherein the fender apron may further include a supporting portion protruding from an outer surface at the first end and the second end of the fender apron respectively, and surrounding the outer surface at the first end and the second end of the fender apron respectively, and wherein each supporting portion is formed in a plate shape to be in surface contact with the front side lower member and the front side upper member respectively.

The fender apron may further include a supporting portion protruding from an outer surface of the fender apron, and surrounding the outer surface of the fender apron, the supporting portion is formed in a plate shape to be in surface contact with the front side member.

A part of the fender apron is inserted into the shock absorber housing.

The fender apron may further include a supporting portion protruding from an outer surface of the fender apron, and surrounding the outer surface of the fender apron, wherein the supporting portion is formed in a plate shape to be in surface contact with the shock absorber housing.

As described above, according to the exemplary embodiment of the present invention, since the pipe-shaped fender apron is applied, work hardening occurs in the process of manufacturing the pipe-shaped fender apron, and as a result, spatial utility at the periphery of the fender apron may be ensured, and rigidity of the fender apron may be increased, in comparison with the case in which the fender apron is formed in a panel shape.

Further, the pipe-shaped fender apron may ensure a degree of design freedom, and improve torsion stress, in comparison with the panel-shaped fender apron.

In addition, since the fender apron is inserted into the front side member, connectivity may be improved so that shock-absorbing performance may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
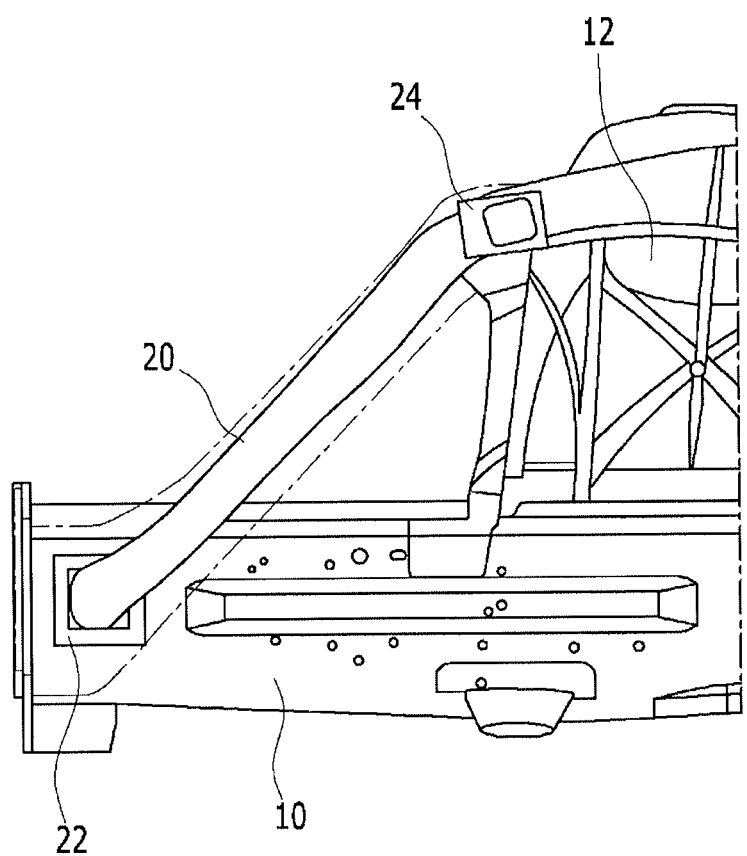
FIG. 1 is an exterior side view of a vehicle body reinforcing structure according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 2:
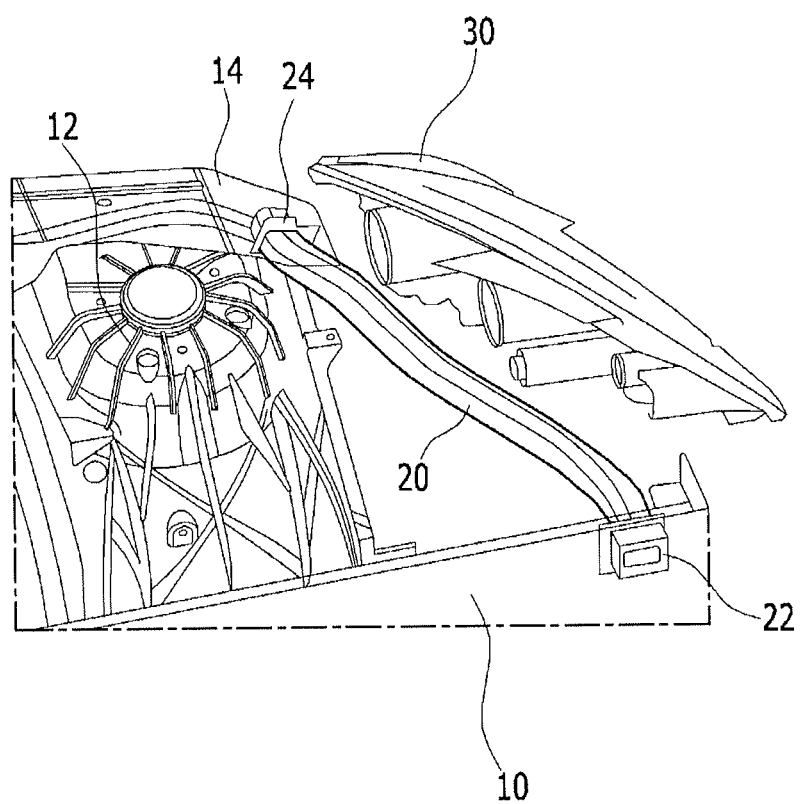
FIG. 2 is an interior perspective view of the vehicle body reinforcing structure according to the exemplary embodiment of the present invention.

FIG. 1 is an exterior side view of a vehicle body reinforcing structure according to an exemplary embodiment of the present invention, and FIG. 2 is an interior perspective view of the vehicle body reinforcing structure according to the exemplary embodiment of the present invention.

As illustrated in FIGS. 1 and 2, a vehicle body reinforcing structure according to an exemplary embodiment of the present invention includes front side members 10 and 14, a shock absorber housing 12, and a fender apron 20.

The front side members 10 and 14 are constituent elements of a vehicle body which are disposed at both sides in a lateral direction of a vehicle, and form a frame of a front body, and the shock absorber housing 12 is a constituent element of the vehicle body in which a shock absorber is mounted.

The front side members 10 and 14 include a front side lower member 10, and a front side upper member 14.

The front side lower member 10 is a part that is connected with a lower end of the shock absorber housing 12, and elongated in a longitudinal direction of the vehicle. Further, the front side upper member 14 is a part that is connected with an upper end of the shock absorber housing 12. That is, the shock absorber housing 12 is installed on the front side members 10 and 14. Because basic functions and configurations of the front side members 10 and 14 and the shock absorber housing 12 are obvious to those skilled in the technical field to which the present invention pertains (hereinafter, referred to as those skilled in the art), a detailed description thereof will be omitted.

The fender apron 20 is a constituent element of the vehicle body which is positioned inside a fender, and interposed between a wheel and an engine room. Further, one end of the fender apron 20 is coupled to the front side lower member 10 in front of the shock absorber housing 12. In addition, the other end of the fender apron 20 is coupled to the front side upper member 14 in the vicinity of the shock absorber housing 12, and thus indirectly coupled to the shock absorber housing 12, or directly coupled to the shock absorber housing 12. A configuration in which the other end of the fender apron 20 is coupled to the front side upper member 14 is illustrated in FIG. 2, but the present invention is not limited thereto, and the other end of the fender apron 20 may be coupled to the shock absorber housing 12.

Meanwhile, the fender apron 20 supports the front side members 10 and 14 and the shock absorber housing 12, disperses force transmitted from a suspension system, and protects various components. Because basic functions and configurations of the fender apron 20 are obvious to those skilled in the art, a detailed description thereof will be omitted.

The fender apron 20 is formed in a pipe shape. Therefore, in a process of manufacturing the pipe-shaped fender apron 20, work hardening is performed, and rigidity of the fender apron 20 is increased. Here, the work hardening refers to an increase in stress of metal as the metal is deformed by processing.

The fender apron 20 according to the exemplary embodiment of the present invention may have a smaller width than the existing fender apron because rigidity of the fender apron 20 is ensured by work hardening. Further, since an overall shape of the fender apron 20 is smaller than the existing fender apron, a weight of the fender apron 20 may be reduced. Meanwhile, it is obvious to those skilled in the art that the reducing of the overall weight of the vehicle is advantageous in consideration of fuel efficiency of the vehicle and the like.

In FIG. 1, a space occupied by the existing fender apron is indicated by imaginary alternate long and short dash lines. Referring to FIG. 1, a difference between a space occupied by the existing fender apron and a space occupied by the fender apron 20 according to the exemplary embodiment of the present invention may be visually identified.

In FIG. 2, the head lamp 30 is illustrated. Referring to FIG. 2, it can be visually identified that as a width of the fender apron 20 becomes small, interference, which may occur between the fender apron 20 and the head lamp 30, is prevented.

The fender apron 20 is formed by hydroforming. In a case in which the fender apron 20 of the pipe shape is bent by hydroforming, the fender apron 20 may be bent to have a slowly curved surface without forming a rapidly bent portion. Meanwhile, in a case in which there is a portion in the pipe shape which is rapidly bent, rigidity of the rapidly bent portion becomes weakened. Further, the fender apron 20 is bent to have a slowly curved surface to prevent interference with the head lamp 30.

Here, the hydroforming is a type of drawing processing of sheet metal processing which is performed using a rubber diaphragm and liquid pressure.

The fender apron 20 includes a first connecting portion 22 and a second connecting portion 24.

The first connecting portion 22 is a portion that is connected to the front side lower member 10, and the second connecting portion 24 is a portion that is connected to the front side upper member 14 or the shock absorber housing 12.

Figure 3:
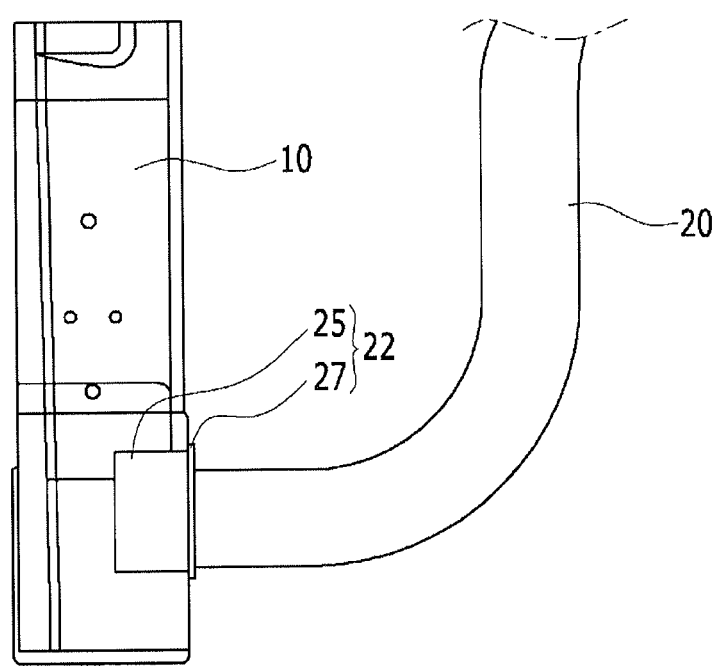
FIG. 3 is a partially top plan view of the vehicle body reinforcing structure according to the exemplary embodiment of the present invention.

FIG. 3 is a partially top plan view of the vehicle body reinforcing structure according to the exemplary embodiment of the present invention.

As illustrated in FIG. 3, the first connecting portion 22 and the second connecting portion 24 each include an insertion portion 25, and a supporting portion 27. Only a structure in which the first connecting portion 22 is connected to the front side lower member 10 is illustrated in FIG. 3, but a structure in which the second connecting portion 24 is connected to the front side upper member 14 or the shock absorber housing 12 is identical to the connection structure between the first connecting portion 22 and the front side lower member 10, and therefore, a description regarding the second connecting portion 24 will be replaced by a description regarding the first connecting portion 22.

The insertion portion 25 is a portion that is inserted into the front side lower member 10. As such, the insertion portion 25, which is a part of the fender apron 20, is inserted into the front side lower member 10, such that coupling force between the fender apron 20 and the front side lower member 10 is increased.

The supporting portion 27 has a shape that protrudes from an outer surface of the fender apron 20, and surrounds the outer surface of the fender apron 20. Further, the supporting portion 27 is formed in a plate shape to be in surface contact with the front side lower member 10. Therefore, the supporting portion 27 prevents the fender apron 20 from being inserted into the front side lower member 10 by an amount greater than a length of the insertion portion 25, and is supported on the front side lower member 10. As such, since the supporting portion 27, which is a part of the fender apron 20, is in surface contact with the front side lower member 10, coupling force between the fender apron 20 and the front side lower member 10 is increased.

Meanwhile, the supporting portion 27 may be coupled to the front side lower member 10 by welding. In this case, a region where the fender apron 20 is welded to the front side lower member 10 becomes larger by the supporting portion 27.

As described above, according to the exemplary embodiment of the present invention, since the pipe-shaped fender apron 20 is applied, work hardening occurs in the process of manufacturing the pipe-shaped fender apron 20, and as a result, spatial utility at the periphery of the fender apron 20 may be ensured, and rigidity of the fender apron 20 may be increased, in comparison with the case in which the fender apron is formed in a panel shape. Further, the pipe-shaped fender apron 20 may ensure a degree of design freedom, and improve torsion stress, in comparison with the panel-shaped fender apron. In addition, since the fender apron 20 is inserted into the front side member 10, connectivity may be improved so that shock-absorbing performance may be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle body reinforcing structure which increases rigidity of a front side member, a shock absorber housing, and a fender apron of a vehicle body,
   wherein the fender apron connects the front side member and the shock absorber housing,
   wherein the fender apron is formed in a pipe shape so that work hardening occurs in a process of manufacturing the pipe-shaped fender apron,
   wherein the fender apron further includes a supporting portion protruding from an outer surface of the fender apron, and surrounding the outer surface of the fender apron, and
   wherein the supporting portion is formed in a plate shape to be in surface contact with the front side member.

2. The vehicle body reinforcing structure of claim 1, wherein the fender apron is formed by hydroforming so that the fender apron is bent to have a slowly curved surface.

3. The vehicle body reinforcing structure of claim 1, wherein the front side member includes:
   a front side lower member connected with a lower end of the shock absorber housing; and
   a front side upper member connected with an upper end of the shock absorber housing,
   wherein a first end of the fender apron is inserted into the front side lower member, and a second end of the fender apron is inserted into the front side upper member to be connected with the shock absorber housing by the front side upper member.

4. The vehicle body reinforcing structure of claim 3,
   wherein the supporting portion protrudes from the outer surface at the first end and the second end of the fender apron respectively, and surrounds the outer surface at the first end and the second end of the fender apron respectively, and
   wherein each supporting portion is formed in the plate shape to be in surface contact with the front side lower member and the front side upper member respectively.

5. The vehicle body reinforcing structure of claim 1, wherein a part of the fender apron is inserted into the shock absorber housing.

6. The vehicle body reinforcing structure of claim 1, wherein the supporting portion is formed in the plate shape to be in surface contact with the shock absorber housing.

* * * * *